(12) United States Patent
Small (10) Patent No.: US 6,449,558 B1
(45) Date of Patent: Sep. 10, 2002

(54) METHOD AND DEVICE FOR CREATING A NETWORK POSITIONING SYSTEM (NPS)

(76) Inventor: David Anthony Small, Unit 4, Georgia Court, 1 Totterdell Street Belconnen, Canberra (AU), 2617

( * ) Notice: Subject to any disclaimer, the term of this patent is extended or adjusted under 35 U.S.C. 154(b) by 0 days.

(21) Appl. No.: 09/701,260

(22) PCT Filed: May 28, 1999

(86) PCT No.: PCT/AU99/00423
§ 371 (c)(1),
(2), (4) Date: Nov. 28, 2000

(87) PCT Pub. No.: WO99/63358
PCT Pub. Date: Dec. 9, 1999

(30) Foreign Application Priority Data

May 29, 1998 (AU) .............................. PP3754

(51) Int. Cl.[7] ................................. G01S 5/02
(52) U.S. Cl. ................... 701/213; 701/214; 701/215; 701/208; 342/357.06; 342/357.08
(58) Field of Search ................. 701/213, 214, 701/215, 207, 223, 224, 216; 342/357.08, 357.14, 357.06; 370/336, 314, 316; 445/457

(56) References Cited

U.S. PATENT DOCUMENTS

| | | | | |
|---|---|---|---|---|
| 5,686,924 A | | 11/1997 | Trimble et al. | 342/357.09 |
| 5,689,269 A | | 11/1997 | Morris | 342/357.08 |
| 5,708,440 A | | 1/1998 | Trimble et al. | 342/357.06 |
| 5,805,108 A | * | 9/1998 | Lennen | 342/357.12 |
| 5,815,114 A | | 9/1998 | Spease et al. | 342/357.06 |
| 5,838,279 A | | 11/1998 | Duffett-Smith et al. | 342/459 |
| 6,002,708 A | | 12/1999 | Fleming et al. | 375/130 |
| 6,101,178 A | | 8/2000 | Beal | 370/336 |
| 6,278,945 B1 | * | 8/2001 | Lin | 701/216 |

* cited by examiner

Primary Examiner—William A. Cuchlinski, Jr.
Assistant Examiner—Marthe Y. Marc-Coleman (57) ABSTRACT

A network positioning system (NPS) uses GNSS-like signals transmitted from a GNSS-synchronized network of terrestrially based, low cost positioning-unit devices. These positioning-unit devices are used for the determination of absolute and relative position in satellite obscured environments, thus allowing seamless transition between GNSS and NPS, e.g., outdoors to indoor. Positioning-unit devices are self-integrating, thus allowing effortless integration of positioning-unit devices into both the GNSS and the NPS network.

32 Claims, 8 Drawing Sheets

METHOD AND DEVICE FOR CREATING A NETWORK POSITIONING SYSTEM (NPS)

The present invention relates generally to positioning systems in which an object or user at an unknown location receives signals from a plurality of sources and uses information derived therefrom to determine the object's or user's current position. More particularly, the present invention relates to a positioning system which utilises a network of self-integrating positioning-unit devices, synchronised to a Global Navigation Satellite System (GNSS), for high accuracy position determination in satellite obscured environments.

BACKGROUND OF THE INVENTION

The need to locate exactly where someone or something is on the world's surface has constantly preoccupied humans. In fact, the precision and predictability with which location can be derived is a yardstick by which a civilization's technological refinement can be judged. Over time, man has improved terrestrial location and navigation, progressing through sextant and chronometer, inertial systems, LORAN, TRANSIT and, most recently, GPS.

The GPS constellation of 24 satellites created by the United States Government broadcasts precise timing signals locked to on-board atomic clocks. Using precise, well-developed formulae, a user receiver that picks up signals from 3 or more satellites simultaneously can determine its position in absolute global co-ordinates, namely latitude and longitude. GPS has proven to be a boon to location determination because it is globally available, it is reasonably precise, and it is free to the end user.

Despite its technological sophistication, GPS still suffers from several critical limitations that impede its wide adoption at consumer level. Firstly, GPS signal strengths require satellites to be "in view" relative to the receiver. This means that no substantial obstruction can exist between the satellites and the receiver. Secondly, GPS formulae require at least 3 satellites to be in view for determination of a 2-dimensional location (i.e., latitude and longitude), and at least 4 satellites to be in view for determination of a 3-dimensional location (i.e., latitude, longitude and altitude). In combination, these two major shortcomings severely disrupt GPS reliability in built-up areas such as "urban canyons", and they ensure that standard GPS will not function at all inside buildings or in shielded environments. GPS is therefore of extremely limited use in metropolitan environments where a large part of the world's population lives.

Surprisingly, further "consumer" limitations of GPS arise from its global availability and its potential for reasonably high precision. In its innate form GPS has the potential to deliver an accuracy of approximately 15 meters. The United States Government became concerned with the possibility that their own satellite system could be used against the United States for accurate delivery of enemy weapons payloads. For this reason, signals broadcast by the GPS network for civilian use are intentionally degraded relative to the more accurate, encrypted U.S. military signals. This degradation, commonly called Selective Availability (SA), reduces the raw accuracy available to civilians to approximately 100 meters 2 dRMS.

In an effort to overcome SA, a system known as Differential GPS (DGPS) was developed for civilian users in a localized area. DGPS is capable of giving accuracy of several meters to a mobile user. However, DGPS demands the establishment of an expensive local broadcasting station. It also necessitates the mobile consumer to purchase additional equipment, in the form of a radio receiver, to acquire DGPS corrections for their GPS receiver. A further recent development called Real Time Kinematic (RTK) allows accuracy from the GPS system to be improved to approximately one centimeter. Whilst this degree of accuracy is highly desirable for many possible applications, RTK is almost wholly the province of highly technical and skilled disciplines such as geodesy, surveying, and physics. RTK receivers are commonly an order of magnitude more expensive than standard GPS receivers are. RTK systems require uncommon local transmitters, and, depending upon the level of complexity can take up to 10 hours of motionless signal acquisition before RTK-accurate positions can be determined. The level of expense necessary for RTK, along with the specialized equipment and skills required, strongly militate against RTK being considered for consumer or commercial use.

In summary: GPS is a marvelous boon to modem location and navigation needs. However, GPS is optimally employed in open field, desert or high-seas environments. Its usefulness is severely compromised in urban canyons, and it was never designed to work indoors. Moreover, should sufficient GPS signals ultimately be acquired in built-up areas, the resultant position solution is so highly degraded by SA that it may prove of little use in restricted areas. If a consumer in this situation, looks to improved accuracy via DGPS or RTK methods, it is only achievable with considerable effort, expense and relatively complex infrastructure.

Attempts to overcome these difficulties, are described in prior art. Hybrid systems have been developed which incorporate an absolute positioning system (e.g., GPS) plus a relative positioning system. Such methods include inertial sensor systems that incorporate "dead reckoning" when satellites are obscured (U.S. Pat. No. 5,311,195) or commercial radio broadcast transmissions performing "delta phase positioning" when satellites are obscured (U.S. Pat. No. 5,774,829).

Unfortunately, these prior art systems have several drawbacks. Dead reckoning exhibits cumulative error with extended use and both dead reckoning and delta phase position accuracy is limited to initial absolute position accuracy. Any initial position ambiguity will therefore be carried on through the subsequent position solutions. Delta phase position accuracy will be constrained by pre-existing geometry of commercial radio broadcast transmission sites. Poor geometry as seen by the roving receiver will produce poor position solutions. In addition, delta phase position accuracy is constrained by the frequency/wavelength of the transmission signal whereby lower frequencies (i.e., longer wavelengths) produce decreased accuracy. Moreover, delta phase roving receivers need a pre-existing knowledge of commercial radio broadcast transmission site co-ordinates. Finally, delta positioning requires a reference receiver and data link in addition to the commercial radio broadcast transmissions. U.S. Pat. No. 5,774,829 suggests that this data link be placed as information on the commercial radio broadcast transmission signal SCA channel. This would potentially require co-operation with thousands of commercial broadcasters, bringing about substantial logistics problems.

Also known in the art are attempts to use pseudo-satellites, or "pseudolites", to enhance or augment the standard GPS constellation. Pseudolites are ground based transmitters that emit GPS-like signals. Pseudolites were first used in 1977 by the US Department of Defense for Phase I GPS testing at the Yuma Proving Ground in Arizona. They were used to augment the GPS constellation for testing user equipment before there were sufficient satellites for navigation. In 1984 Klein and Parkinson were the first to point out that pseudoiites could be a useful adjunct to the operational GPS system, improving navigation availability and geometry for critical applications such as aviation. In 1986 Parkinson and Fitzgibbon developed and demonstrated a procedure for finding the optimal location for a ranging pseudolite. Also in 1986 the RTCM-104 committee, which developed the first standard for local area DGPS systems, proposed a method for transmitting DGPS information by pseudolite.

Pseudolites are currently expensive devices and are manufactured in extremely small quantities. They generally transmit their signals on the GPS L1 and L2 frequencies, so they normally need regulatory approval to operate. Experimental groups within Universities, government agencies, the military or very large companies have therefore customarily used pseudolites. So whilst these devices have been known for a long period of time, their use in general location and navigation is extremely rare. The prior art reflects the limited availability of pseudolites.

Several industries have used pseudolites to enhance GPS signals in localised areas. Aviation use of pseudolite devices is typified by U.S. Pat. No. 5,572,218 which describes a method of placing a pseudolite at the end of a runway below the final approach path of an aircraft. This successfully allows extremely fast integer cycle ambiguity resolution, generating very precise positioning. U.S. Pat. No. 5,375,059 is representative of how companies like Caterpillar have applied pseudolites to open-pit mining, which is one of the more typical applications of these devices. These systems employ conventional local-area pseudolite/reference station configurations well known in the art.

U.S. Pat. No. 5,686,924 "Local-area position navigation system with fixed pseudolite reference transmitters" and U.S. Pat. No. 5,708,440 "Pseudolite translator for unlicensed frequencies"(both to Trimble, et al.) jointly describe augmentation of GPS signals over a local area. This local area system has no clear provision for pseudolite/reference station integration and therefore lacks the fundamental prerequisite of time coherence for accurate position determination.

One prior art reference is known that specifically generates GPS signals indoors. U.S. Pat. No. 5,815,114 (Speasl, et al.) describes a pseudolite system positioned in an entirely shielded environment. This system uses signals regenerated by a computer processing unit. These signals are distributed via coaxial cable to four pseudolites in an area within a building. This local area system requires an extremely complex and extensive installation, as well as total shielding from the GNSS constellation to ensure original and regenerated signals do not conflict.

All of these prior art citations disclose rudimentary pseudolite systems used in local-area, closed systems.

No prior art discloses a method or device, nor teaches techniques, which: (a) allow seamless integration of a network of terrestrially-based positioning-unit devices into a GNSS system, and; (b) allow substantially endless propagation of positioning-unit devices over a substantially unlimited area.

The necessity for extremely precise location services in built-up areas is growing rapidly. The proliferation of hand-held consumer devices and the desire for location-dependant information are disclosing a need for a workable, integrated and complete solution. In hand-held applications, the SA degraded accuracy of standard GPS is unsatisfactory; meter level accuracy or better is essential. A system that would allow seamless transition from outdoors to indoor, without necessitating different location technologies, is highly desirable. A system that would propagate itself, and then allow continued expansion, both indoor and outdoor, is also highly desirable. Further, integration with a world standard system like GPS would bring synergies to the system in the form of readily available and standardized components, simplified manufacturing and use of well-known techniques. A system that provides these benefits to the public at consumer-level prices, without expert assistance for infrastructure construction, is also most desirable. The prior art does not meet all these manifest needs.

Hence, it is a goal of the present invention to overcome the above stated disadvantages of GPS positioning, as well as providing a system that compliments, enhances and extends GPS-style techniques using entirely novel methods.

SUMMARY OF THE INVENTION

It is, therefore, an object of the present invention to improve position location systems.

Another object of this invention is to increase the number of situations in which a GNSS-based position location system may be used.

It is a further object of this invention to disclose an open-architecture network of terrestrially-based positioning-unit devices that can be propagated over an unlimited area.

Still another object of this invention is to employ GNSS-like signals throughout a terrestrially-based positioning network.

It is still a further object of this invention to teach a method of creating and propagating a terrestrially-based positioning network.

Yet another object of this invention is to provide a network of positioning-unit devices that can integrate seamlessly with a GNSS constellation.

An additional object of this invention is to provide a network of positioning-unit devices that can synchronise with a GNSS constellation.

Yet a further object of this invention is to provide a positioning network which will allow seamless transition from a GNSS-based location to a network-based location, or derive a location from any apportionment of each location system.

It is yet a further object of this invention to provide a positioning network, which will allow seamless transition from a GNSS-based location to a network-based location, or derive a location from any apportionment of each location system, utilising a unitary roving device attuned to each location system.

Yet another object of this invention is to provide a network of positioning-unit devices that can augment GNSS location systems within urban canyon environments.

Still yet another object of this invention is to provide a network of positioning-unit devices that can extend GNSS-style absolute positioning into satellite obscured areas, inside buildings and other structures, and into other environments where traditional GNSS has not previously functioned.

It is yet still a further object of the present invention to disclose a positioning-unit device that can self-survey and self-integrate into the GNSS constellation and/or current network of positioning-unit devices, thereby providing both absolute and relative positioning in any satellite obscured or indoor environments.

Still another further object of the present invention is to teach protocols for initiating and maintaining communications between positioning-unit devices, thereby allowing network information to be passed between positioning-unit devices.

It is yet another object of the present invention for each positioning-unit device to include a reference receiver to provide distributed differential corrections throughout the network.

It is yet another further object of the present invention to provide Real Time Kinematic positioning throughout the network, thus providing centimeter accuracy.

In additional object of the present invention is to provide pseudorange and carrier phase measurements for both GNSS satellites and Network Positioning System (NPS) positioning-unit devices, thus providing both meter and centimeter position accuracy.

Still another object of the present invention is to provide dual frequency pseudolite transmissions which allow single epoch carrier phase integer ambiguity resolution within environments enhanced by positioning-unit devices.

It is still a further object of the present invention to provide triple frequency receivers to accept GNSS signals and two additional pseudolite signals.

Yet another object of the present invention is for positioning-unit devices to accept WAAS differential corrections so as to provide differential corrections when no network differential corrections are available.

An additional object of the present invention is to provide a positioning-unit device that incorporates current GNSS technology to maintain substantial compatibility between systems.

Still yet another object of this invention is to provide a network of positioning-unit devices that may be propagated by non-technical personnel, thereby eliminating the expensive infrastructure requirements and the need for specialist skills.

To fully understand the invention and the way that it uniquely combines prior knowledge to provide novel, new, and unexpected results it is important to be conversant with the following positioning fundamentals.

Overview of GPS Fundamentals

Figure 1:
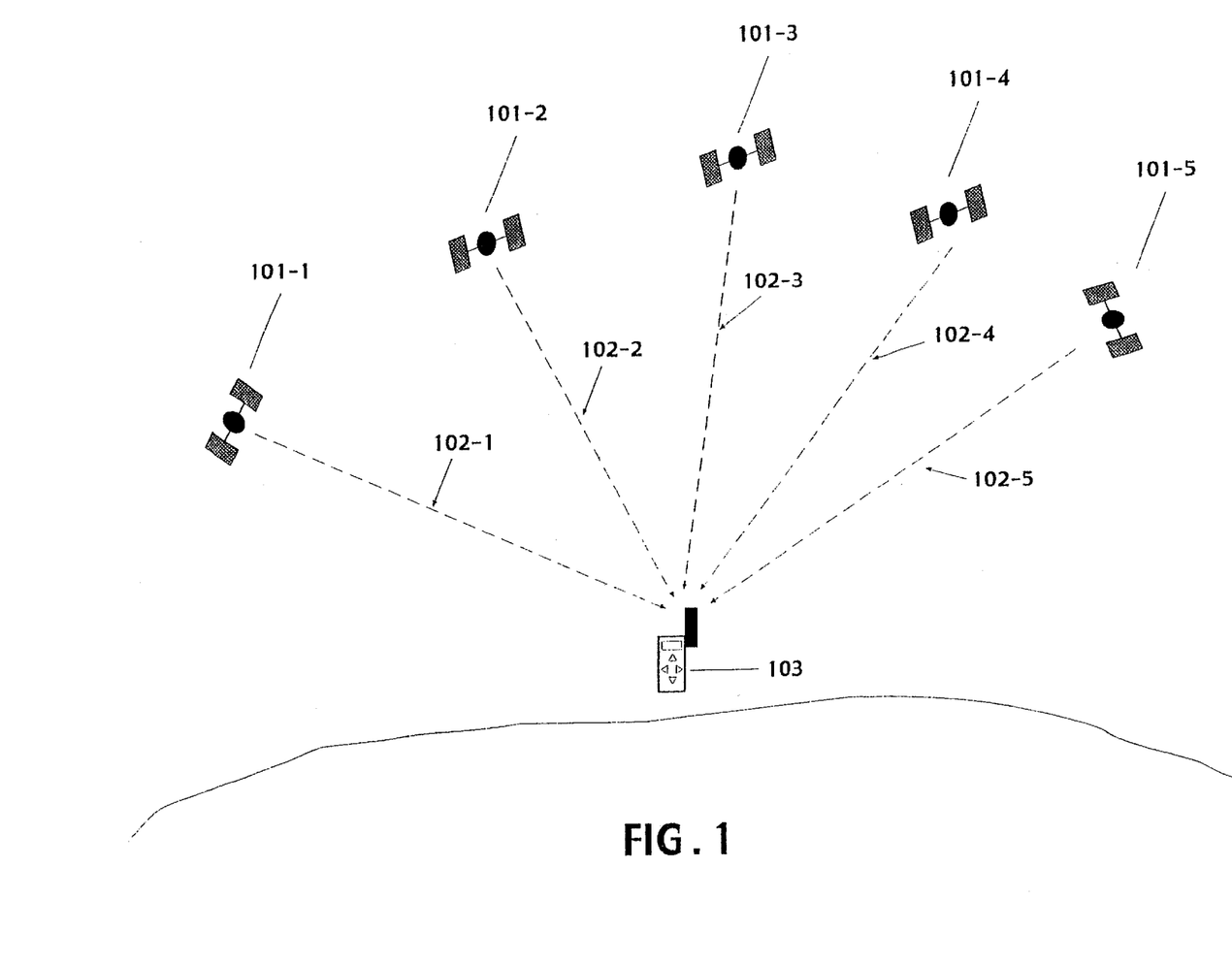
FIG. 1 is a graphical representation of a prior art Global Positioning System (GPS)

Referring to FIG. 1, there are depicted a plurality of GPS satellites 101, each of which broadcasts a positioning signal 102. Each positioning signal is precision timed through the use of atomic time standards aboard each GPS satellite 101, and monitored by a ground control segment for time integrity. The latitude, longitude, and attitude of any point close to the earth can be calculated from the propagation times of the positioning signals 102 from at least four of these GPS satellites 101 to the unknown location 103. The measured range is referred to as pseudorange as there is a time difference, or offset, between timing clocks on the satellites 101 and a timing clock within the GPS receiver 103. For three-dimensional position determination at least four satellites are typically needed to solve for four unknowns, i.e., the time-offset together with the three-dimensional (x, y, z) position.

GPS time as measured by a GPS receiver is contaminated by six major error sources: (1) Selective Availability; (2) ionospheric delay; (3) tropospheric delay; (4) ephemeris error; (5) satellite clock error and; (6) multipath. Selective Availability is the intentional degradation of GPS satellite timing and position accuracy by the US Department of Defense for reasons of US national security. Ionospheric delay is the varying time delay experienced by electromagnetic waves when passing through bands of ionised particles in the ionosphere. Tropospheric delay is the time delay experienced by electromagnetic waves when passing through moisture in the lower atmosphere. Ephemeris error is the difference between the actual satellite location and the position predicted by satellite orbital data. Satellite clock error is the difference between actual satellite GPS time and that predicted by satellite data. Multipath is the signal delay caused by localised signal reflections in close proximity to a GPS receiver. The error budget specified by the US Department of Defense for autonomous GPS is 100 metres 2 dRMS. If greater position accuracy is required, a technique known as "Local Area Differential GPS" can be implemented.

Overview of Local Area Differential GPS (LADGPS) Fundamentals

All GPS errors, excluding multipath and receiver noise, are "spatially correlated", that is, the sum of all errors is consistent for receivers in close proximity to one another. Local Area Differential GPS (LADGPS) reduces spatially correlated errors in the GPS satellite signals to negligible levels.

Figure 2:
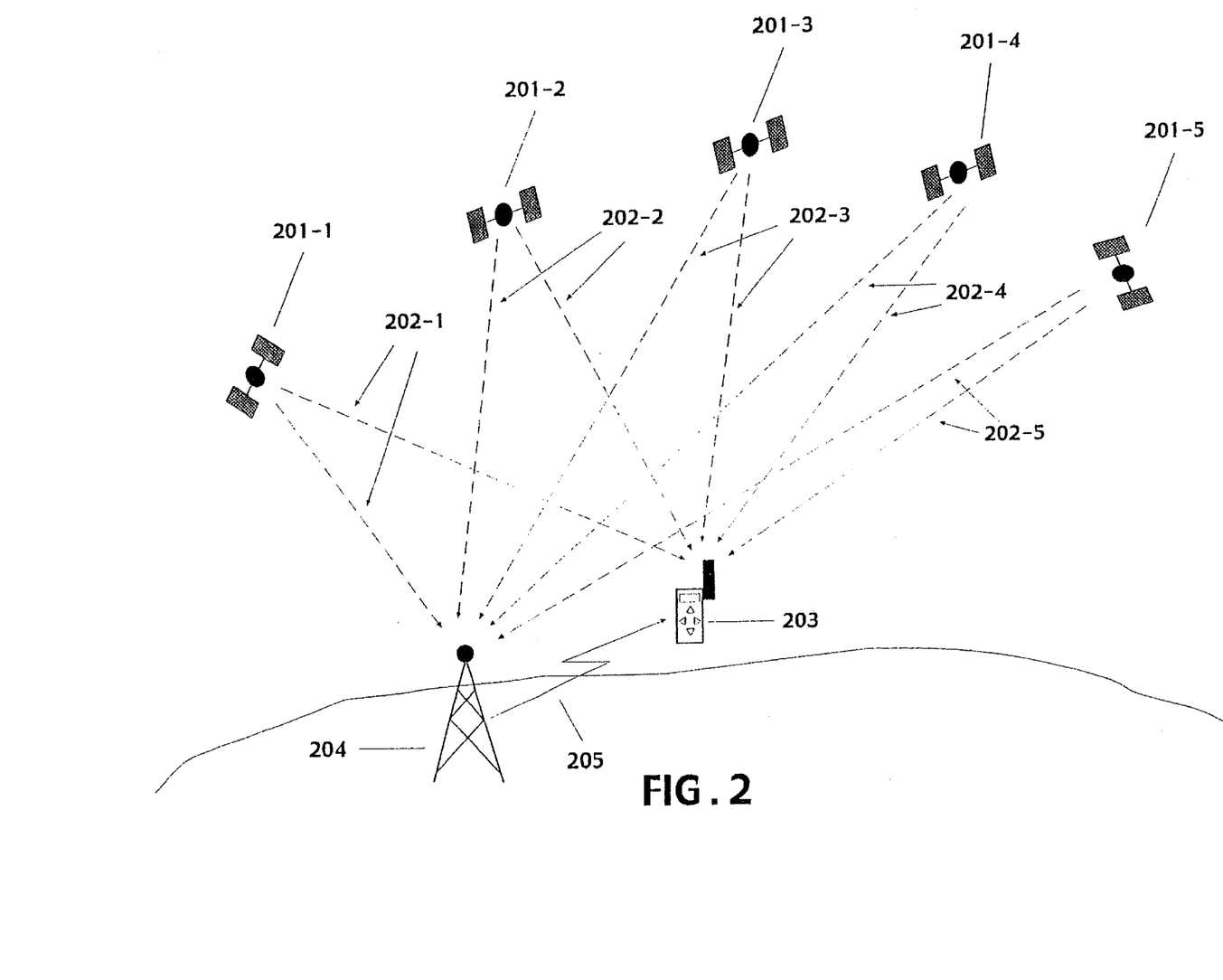
FIG. 2 is a graphical representation of a prior art Differential Global Positioning System (DGPS)

Referring now to FIG. 2, there are depicted a plurality of GPS satellites 201, each of which broadcasts a positioning signal 102, a Local Area Differential GPS (LADGPS) reference receiver 204, an RF data link 205, and a GPS receiver 203. The LADGPS reference receiver 204, installed at a well-known location, computes an assumed pseudorange for each satellite signal it detects. It then measures the received pseudoranges from the GPS satellites 201 and subtracts the assumed pseudoranges from the received pseudoranges, forming a differential correction. The LADGPS reference station 204 then transmits these corrections as digital data to the GPS receiver 203 via the RF data link 205. The GPS receiver 203 adds these corrections to the pseudoranges it measures for the same satellites before calculating a position solution. Errors common to both reference receiver 204 and the GPS receiver 203, are completely removed by this procedure.

Figure 3:
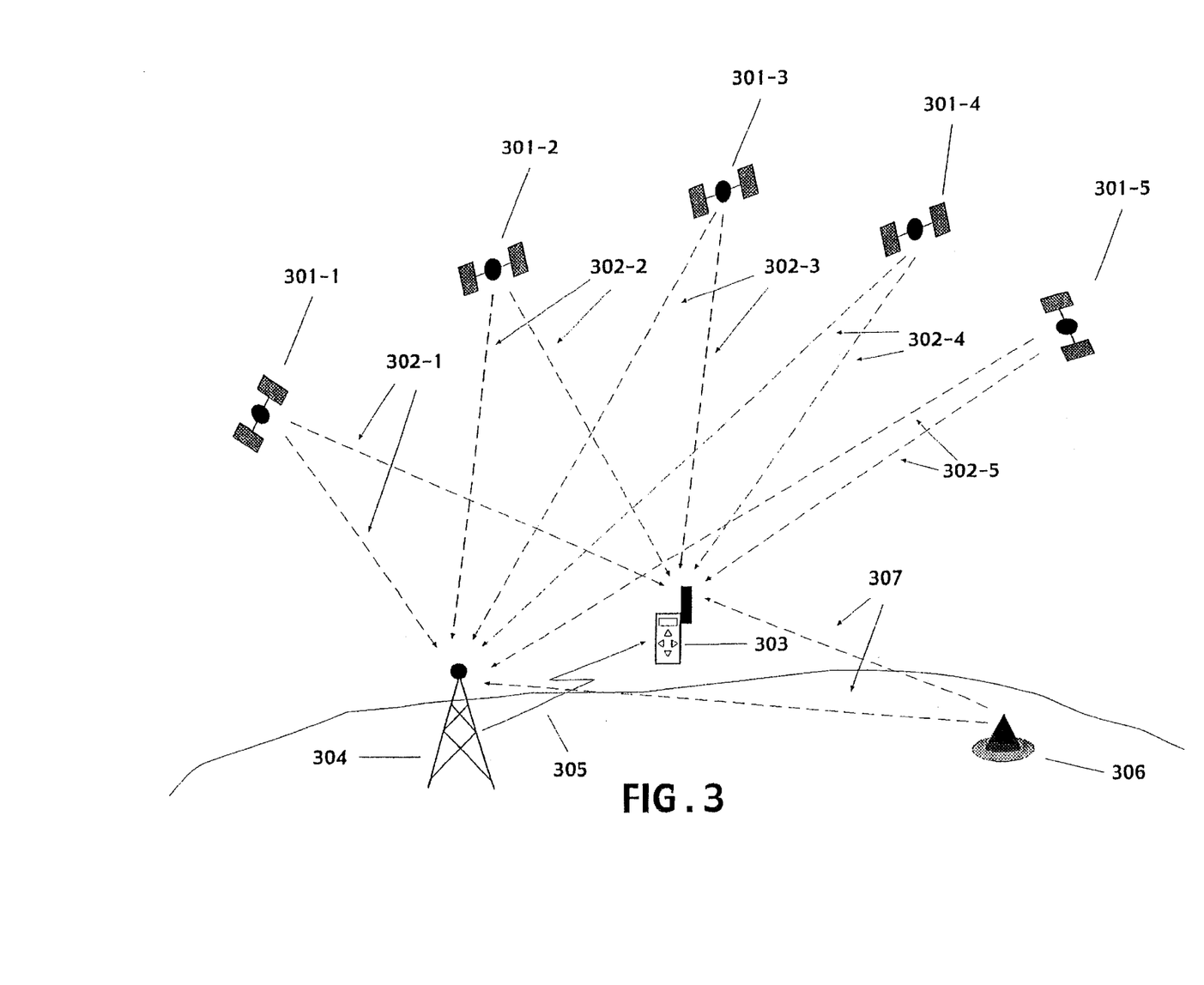
FIG. 3 is a graphical representation of a prior art Differential Global Positioning System (DGPS), incorporating a differentially corrected pseudolite transmitter.

Pseudolites can be incorporated into an LADGPS solution in the same way that satellites can be. Referring now to FIG. 3, there are depicted a plurality of GPS satellites 301, each of which broadcasts a positioning signal 302, a Local Area Differential GPS (LADGPS) reference station 304, an RF data link 305, a GPS receiver 303, and a pseudolite transmitter 306 which also broadcasts a positioning signal 307. When a pseudolite transmitter 306 is incorporated into a LADGPS system the reference receiver 304 synchronously measures the pseudolite pseudorange transmissions 307 and transmits pseudorange correction information incorporating the pseudolite clock error to the GPS receiver 303 via the RF data link 305.

LADGPS corrections improve GPS position accuracy to several metres. If greater accuracy is required a technique known as "Carrier Phase Differential GPS"(CDGPS) can be implemented.

Overview of Carrier-Phase Differential GPS (CDGPS) Fundamentals

Carrier-phase differential GPS (CDGPS) calculates the difference between the reference location and the user location using the differences between the carrier phases measured at the reference receiver and the user receiver.

Referring again to FIG. 3, there are depicted a plurality of GPS satellites 301, each of which broadcasts a positioning signal 302, a Carrier-Phase Differential GPS (CDGPS) reference station 304, an RF data link 305, a GPS receiver 303, and a pseudolite transmitter 306 which also broadcasts a positioning signal 307. The CDGPS reference receiver 304, installed at a well-known location, calculates instantaneous phase measurements for all satellites 301 and pseudolites 306 in view. Carrier phase data from the reference receiver 304 is then broadcast to the GPS receiver 303 via the RF data link 305. The GPS receiver 303 also calculates instantaneous phase measurements for all satellites 301 and pseudolites 306 in view, and subsequently computes a phase difference to determine the position of the GPS receiver 303 with respect to the reference receiver location 304.

The user receiver can measure the fractional phase plus an arbitrary number of whole cycles of the carrier, but cannot directly determine the exact number of whole cycles in the pseudorange. This number, known as the "integer cycle ambiguity", must be determined by other means. Traditional strategies for resolving carrier phase integer ambiguities fall into three broad classes: search methods, filtering methods, and geometrical methods. These traditional methods do not yield instantaneous integer cycle ambiguity resolution.

A recent technique, known as "wide-laning", has been developed to overcome the non-instantaneous integer cycle ambiguity resolution problem. Wide-laning multiplies and filters two carder frequencies (traditionally GPS L1 & L2) to form a beat frequency signal. This beat frequency wavelength is significantly longer than the wavelengths of the two individual carriers. Consequently, resolution of the integers can be accomplished by using pseudorange observations to determine the integer ambiguity of the wider "lanes" formed by the beat frequency signal. These, in turn, greatly reduce the volume of integers that must be searched to resolve the integer ambiguity.

With the integer cycle ambiguity resolved CDGPS techniques can yield real-time centimetre accuracy.

DETAILED DESCRIPTION OF THE PREFERRED EMBODIMENT

As used herein the term "position" includes within its scope longitude, latitude, and altitude, and the term "positioning-unit device" includes within its scope both stationary and mobile devices.

In the preferred embodiment a positioning-unit device consists of a transmit and receive means for communication between all "in-view" positioning-unit devices, a processing means for performing absolute and/or relative position calculations, and a control means for controlling network data obligations.

Because mobile positioning-unit devices operate and integrate into the network using the same principles as stationary positioning-unit devices, mobile positioning-unit devices can also be used as dynamic beacons, if so desired. Therefore, a mobile positioning-unit device can integrate the positioning signals of other mobile positioning-unit devices in close proximity into its own range calculations to increase position accuracy. In the preferred embodiment there is no requirement for a mobile positioning-unit device to transmit any positioning signal.

In accordance with the present invention, determination of the absolute and relative position of positioning-unit devices is effected using a network of positioning-unit device transmissions synchronised to signals provided by a Global Navigation Satellite System (GNSS). Although the preferred embodiment described herein is discussed-with reference to a GNSS comprised of the Global Positioning System (GPS), other GNSS or absolute position systems may also be employed without deviating from the scope of the invention.

This invention has particular, but not exclusive application in locations where current GPS technologies are obscured from view. These environments include central business district "urban canyons" and indoor environments.

In the preferred embodiment a positioning-unit device utilises code (CDMA) and time (TDMA) vision multiplexing to allow the integration of large numbers of positioning-unit devices into the network, whilst maintaining a single transmit/receive frequency.

A positioning-unit device determines its own position by first listening for GPS satellites and/or other positioning-unit devices in the network, and performing range calculations based on the received positioning signals. This initial listening period also allows the positioning-unit device to determine a vacant time and code slot available for its own transmission cycle.

Once a time and code slot has been selected, the positioning-unit device begins to transmit its positioning signal in its selected time and code slot. If the number of operational positioning-unit devices in a substantial area exceeds the number of CDMA and TDMA slots available, then an eligible positioning-unit device wishing to enter the network will continue to listen until a slot becomes available. Therefore the system offers automatic positioning-unit device redundancy.

Positioning-unit device transmitters are pulsed to: (a) adhere to the time division multiple access (TDMA) requirements of the network; (b) allow the co-located receiver to receive ranging signals from other sources on the same transmit frequency, and; (c) alleviate the well known near/far problems associated with CDMA spread spectrum techniques.

Figure 4:
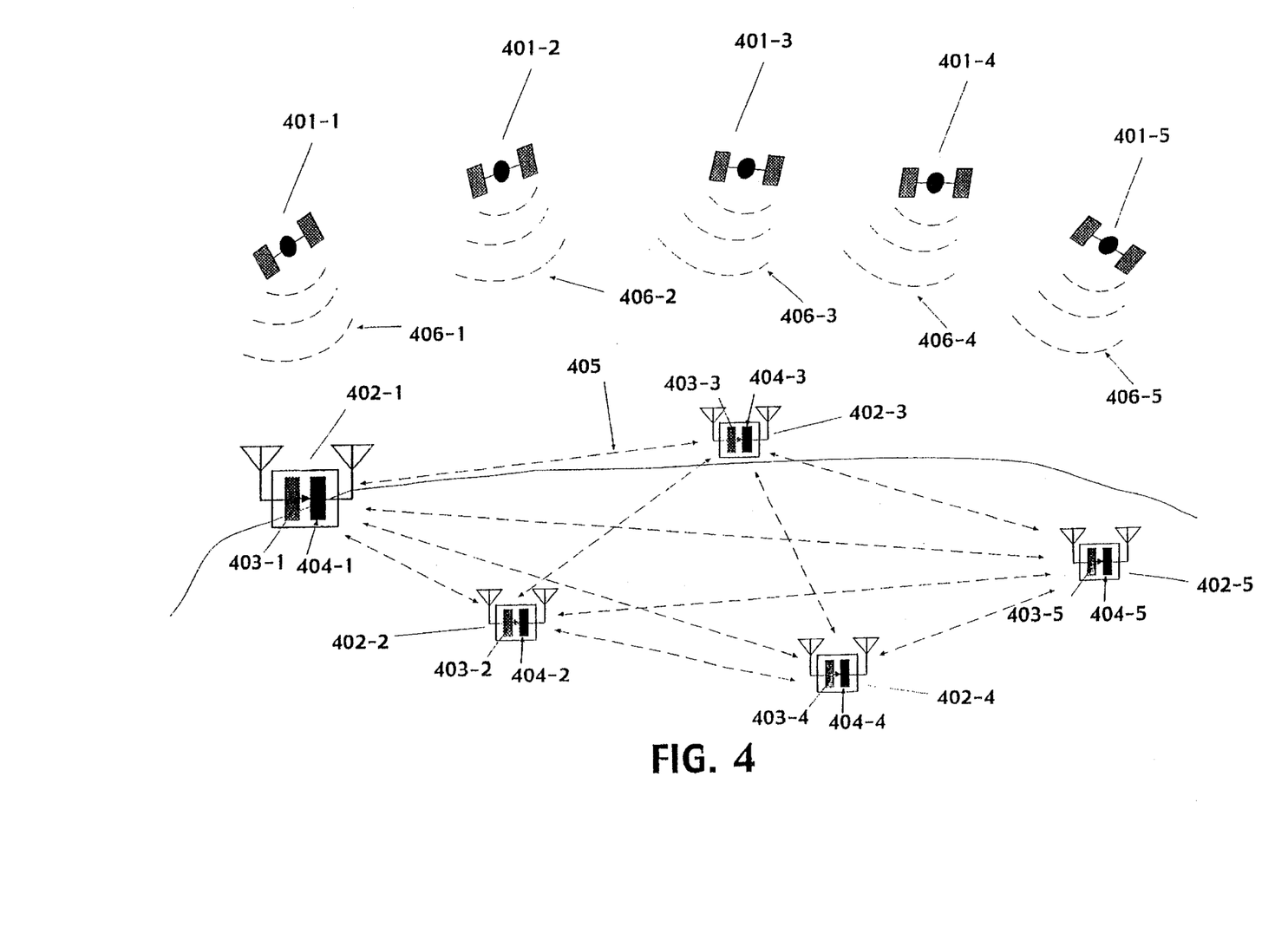
FIG. 4 is a graphical representation of one embodiment of the Network Positioning System according to the present invention, incorporating direct-ranging positioning-unit devices.

Referring now to FIG. 4, there is depicted a direct-ranging absolute positioning network. A direct-ranging positioning-unit device 402 incorporates a receiver 403 and a co-located pulsed transmitter 404. The receiver 403 is capable of receiving positioning signals 406 from all GPS satellites in view 401 and positioning signals 405 from all positioning-unit device transmitters in view 404. The receiver 403 determines position and GPS time from at least tour satellite signals 406 and/or positioning-unit device transmissions 405 in view and transmits this position and GPS time information from its co-located pulsed transmitter 404. This transmitted positioning signal can then be used as a direct-ranging source by any other positioning-unit device in view.

All positioning-unit devices synchronise their transmissions directly to GPS time, therefore creating a direct-ranging absolute positioning network. However, the direct-ranging network accuracy is constrained by the GPS composite clock accuracy. The US Department of Defense error budget for autonomous GPS is 100 meters 2 dRMS, or 340 nanoseconds (95% of the time). To obtain greater accuracy from a direct-ranging absolute positioning network, clock-smoothing techniques are required. The transmitter clock must be stable to within a few nanoseconds per day to average out these errors. This currently requires atomic time standards, which are expensive and inherently complex. Without this atomic time smoothing the direct-ranging network will have an equivalent accuracy to that of autonomous GPS, in the order of 100 meters 2 dRMS.

Whilst atomic time standards could be used, it is an object of the preferred embodiment to allow mass-manufacture and consumer level access to the network. Therefore, the preferred embodiment incorporates a differential correction of the absolute positioning network to give the required increase in accuracy.

Figure 5:
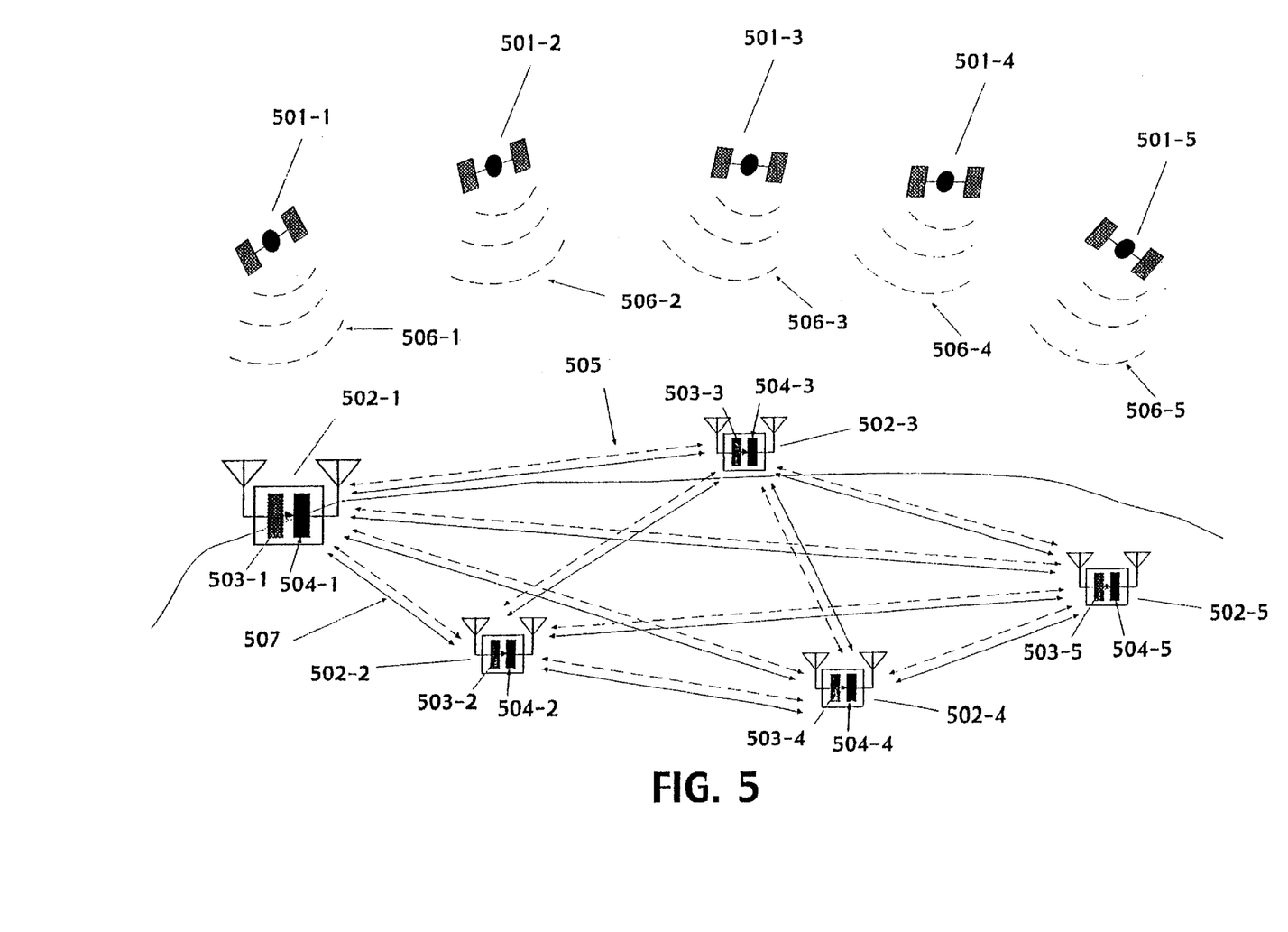
FIG. 5 is a graphical representation of the preferred embodiment of the Network Positioning System according to the present invention, incorporating differentially corrected positioning-unit devices.

Referring now to FIG. 5, there is depicted a differentially corrected positioning network. A differentially corrected positioning-unit device 502 incorporates a reference receiver 503 and a co-located pulsed transmitter 504. The reference receiver is capable of receiving positioning signals 506 from all GPS satellites in view 501 and positioning signals 505 from all positioning-unit device transmitters in view 504. The reference receiver 503 determines position and GPS time from at least four satellite signals 506 and/or positioning-unit device transmissions 505 in view, and transmits this position and GPS time information, together with real-time LADGPS corrections 507 from its co-located pulsed transmitter 504. This creates a distributed LADGPS reference receiver network.

By overlaying LADGPS corrections on an absolute positioning network, accuracy is increased to several metres. Differential corrections to the user position are determined relative to the position and the clock of the LADGPS reference receiver that is in use at any given moment. Importantly, precision clock information is not required at the reference receiver. This is because the known reference receiver position is four-dimensional. That is, it includes a local time correction. Any consistent timing error for all pseudorange corrections will only effect the user receiver clock. Assuming that the user is interested only in the receiver position, this clock correction therefore becomes arbitrary.

Each positioning-unit device receives LADGPS corrections from all positioning-unit devices in view. Therefore a positioning-unit device could have access to twelve or more LADGPS corrections simultaneously. A positioning-unit device must use corrections from only one LADGPS source when any position solution is being calculated. A positioning-unit device could further improve its position integrity by calculating position solutions from all LADGPS sources in view before providing a final averaged LADGPS position solution.

Alternatively the positioning-unit device can weight LADGPS selection according to any other predetermined selection criteria, such as: (a) reference receiver proximity, i.e., the closer the reference receiver is to a user device, the higher the probability of multipath spatial correlation and the lower the effect of epsilon error in the differential solution; (b) reference receiver geometry, i.e., good geometry of local positioning-unit devices provides higher accuracy LADGPS corrections; (c) correlation of observable sources, i.e., a reference receiver must see at least the same set of satellites and/or pseudolites (observables) as the user device; (d) signal strength/data integrity, i.e., data must be received with good signal to noise ratios for minimal error correction.

Of particular concern to pseudorange accuracy is multipath, particularly in indoor environments. This error source can produce pseudorange inaccuracy of tens of meters. However, multipath effects can be considerably reduced, to the order of centimeters, when using carrier phase methods. It is preferred that positioning-unit devices utilise carrier phase measurements for high accuracy position determination and elimination of pseudorange multipath effects.

Carrier phase differential GPS (CDGPS) measurements suffer from integer cycle ambiguity, and as such require a method to resolve this problem. Dual-frequency wide-laning is the preferred solution to ambiguity resolution in high multipath environments. Integers can be determined in a single epoch, and are continually determined thereafter, thus making cycle slips inconsequential.

Referring again to FIG. 5, there is depicted a carrier phase differentially corrected network. A carrier phase differentially corrected positioning-unit device 502 incorporates a reference receiver 503 and a co-located dual-frequency pulsed transmitter 504. The reference receiver is capable of receiving positioning signals 506 from all GPS satellites in view 501 and positioning signals 505 from all positioning-unit device transmitters in view 504. The reference receiver 503 determines position and GPS time from at least four GPS signals 506 and/or positioning-unit device transmissions 505 in view, and transmits this position and GPS time information, together with realtime LADGPS and CDGPS measurements 507 from its co-located dual-frequency pulsed transmitter 504. This creates a distributed LADGPS/CDGPS reference receiver network. By using CDGPS solutions in a Network Positioning System (NPS) environment, position accuracy is increased to several centimeters. The well-known technique, "double differencing", is used to eliminate clock errors.

Communication Protocols

The development of a self-integrating Network Positioning System (NPS) requires specific communication protocols between positioning-unit devices. Each of the positioning-unit devices uses CDMA Gold Codes for GPS satellite and positioning-unit device acquisition and identification. The GPS design specification uses Gold Code numbers 1 to 32 for satellites, and Gold Code numbers 33 to 37 for pseudolites. The GPS specification also assigns further Gold Code numbers to other systems such as WAAS and EGNOS. In order to integrate positioning-unit devices into the standard GPS system, it is preferred that positioning-unit devices use Gold Codes not already assigned by the standard GPS system. Gold Codes are dynamically selected for each positioning-unit device to ensure each positioning-unit device has a unique identity within the in-view network.

Positioning-unit devices are required to pass relevant GPS and NPS information throughout the network.

The communicated GPS components are: (a) GPS time, used to synchronise and direct-range from the GPS constellation, and; (b) GPS almanac data, used to maintain positioning-unit devices at 'sky ready' state in satellite obscured environments.

The communicated NPS components are: (a) NPS time, used to synchronise GPS and NPS time, including any NPS and GPS clock corrections; (b) positioning-unit device location expressed as an Earth Centered Earth Fixed (ECEF) position co-ordinate; (c) NPS LADGPS/CDGPS data, and; (d) NPS dynamic almanac data (DAD).

Figure 6:
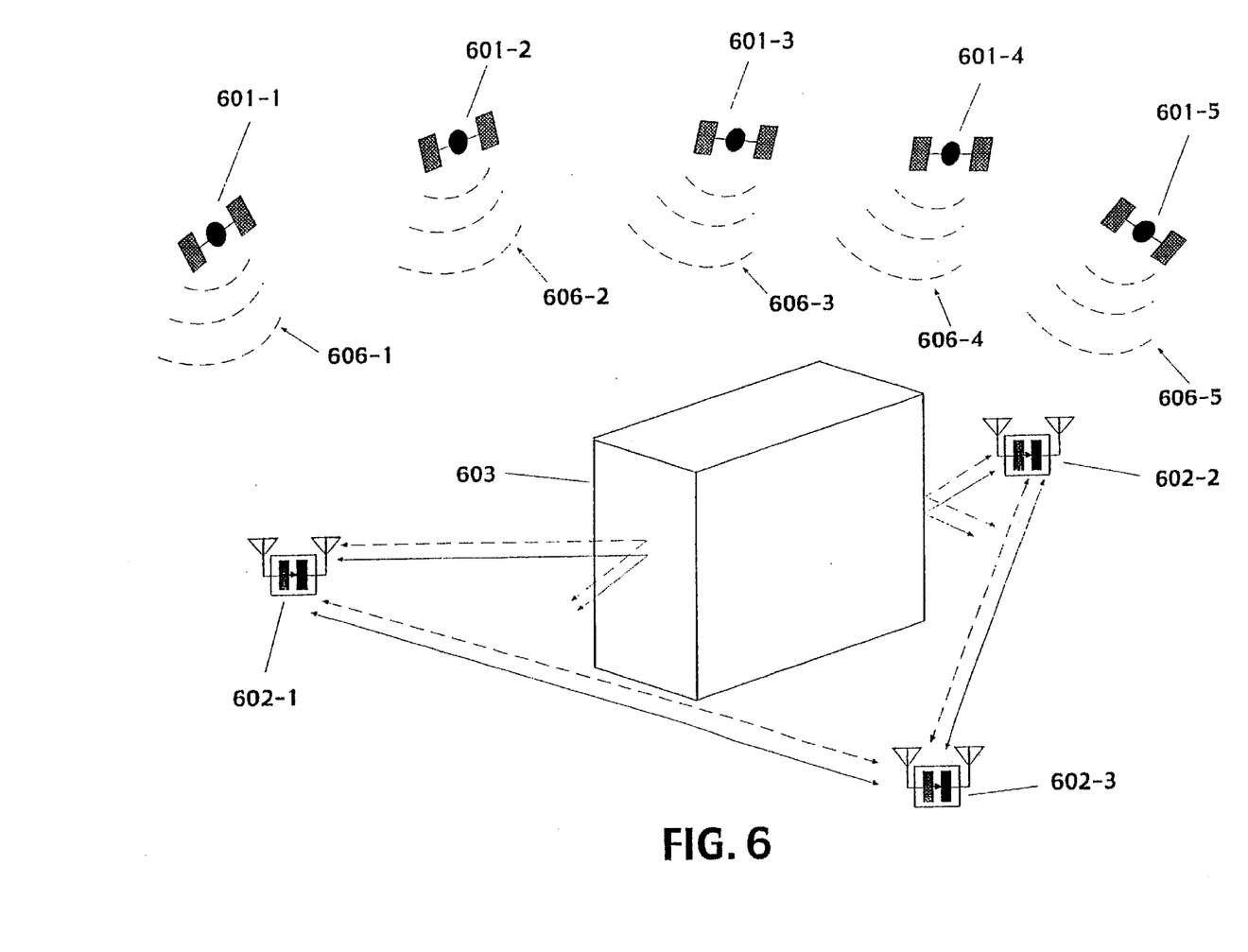
FIG. 6 is a graphical representation of the another embodiment of the Network Positioning System according to the present invention, in a positioning-unit device obscured environment.

Dynamic almanac data is required for network propagation integrity. Referring to FIG. 6, several positioning-unit devices 602 are positioned in an area where creation and propagation of the NPS is desired. The first positioning-unit device 602-1 is obscured from the second positioning-unit device 602-2 by way of a building 603. However, a third positioning-unit device 602-3 can receive data from both the first positioning-unit device 602-1 and the second positioning-unit device 602-2. This can lead to a potential CDMA conflict if the first positioning-unit device 602-1 begins transmission on (say) CDMA Gold Code 33, and the second positioning-unit device 602-2 also selects to commence transmission on CDMA Gold Code 33. The third positioning-unit device 602-3 would then receive two positioning-unit devices on the same CDMA Gold code. This potential problem can be eliminated by the use of "dynamic almanac data"(DAD).

In the conventional GPS system, each satellite transmits the same almanac data, which has been uploaded from the GPS control segment. This almanac data describes all satellite orbital parameters and identification numbers for the entire current GPS constellation.

The NPS system uses a dynamic almanac that is unique to each positioning-unit device. The dynamic almanac data generated by each positioning-unit device describes: (a) a positioning-unit devices' own position and TDMA slot and/or CDMA Gold Code number, and (b) a catalogue of TDMA slot and/or CDMA Gold Code number and position data for all other positioning-unit devices in view. A positioning-unit device requiring to integrate into the network will interrogate the dynamic almanac data from all positioning-unit devices in view to determine a suitable TDMA slot and/or CDMA Gold Code number to transmit. This DAD protocol will prevent TDMA slot and/or CDMA Gold Code number conflict.

It is also possible for the dynamic almanac data to include other information such as positioning-unit device doppler information for fast satellite and positioning-unit device acquisition, as well as unique user identification for fast search functions of the NPS.

Given adequate NPS bandwidth for communication purposes, it is possible for positioning-unit devices to send unique user data throughout the NPS. This data may include information such as unique user ID, position, time, and command functions such as "please direct a taxi cab to me now". Information may be passed to a central gateway service whereby location-based user requests are received and processed. In the above example the taxi company will issue a response confirming the booking, and giving anticipated wafting time for arrival of the cab.

Information may also be passed through the NPS without the need for a central gateway service. This information may include such functions as "find" commands when looking for other positioning-unit devices in the network.

Preferred Signal & Hardware Structure

It is highly advantageous for positioning-unit devices to maintain compatibility with existing GPS technology. This ensures maximum utilisation of existing GPS hardware, while minimising the cost for positioning-unit device manufacture and miniaturisation. The NPS remains closely linked to existing GPS structures by incorporating fundamental elements such as: (a) sinusoidal direct-sequence spread spectrum transmissions; (b) 1023 bit bi-phase shift key modulated pseudorandom "Gold codes"; (c) chipping rates of 1.023 MHz; (d) bi-phase shift key modulated navigation messages; (e) standard autocorrelation techniques and correlator hardware; (f) standard RF receiver design for L1 reception; (g) standard GPS controller and memory design.

However, the original GPS infrastructure was never designed to integrate a terrestrially based positioning system. For the NPS to extend the essence of GPS technology throughout a propagating terrestrial positioning network, the fundamental GPS elements are enhanced, in the preferred embodiment, as follows: (i) frequency offsets for positioning-unit device reception and transmission, which also facilitates use of wide-lane integer ambiguity resolution techniques; (ii) increased receiver dynamic range for positioning-unit device reception (iii) increased data bandwidth for the navigation and additional communication messages; (iv) use of additional Code Division Multiple Access (CDMA) Gold Codes; (v) communication protocols for the integration and propagation of positioning-unit devices.

Figure 7:
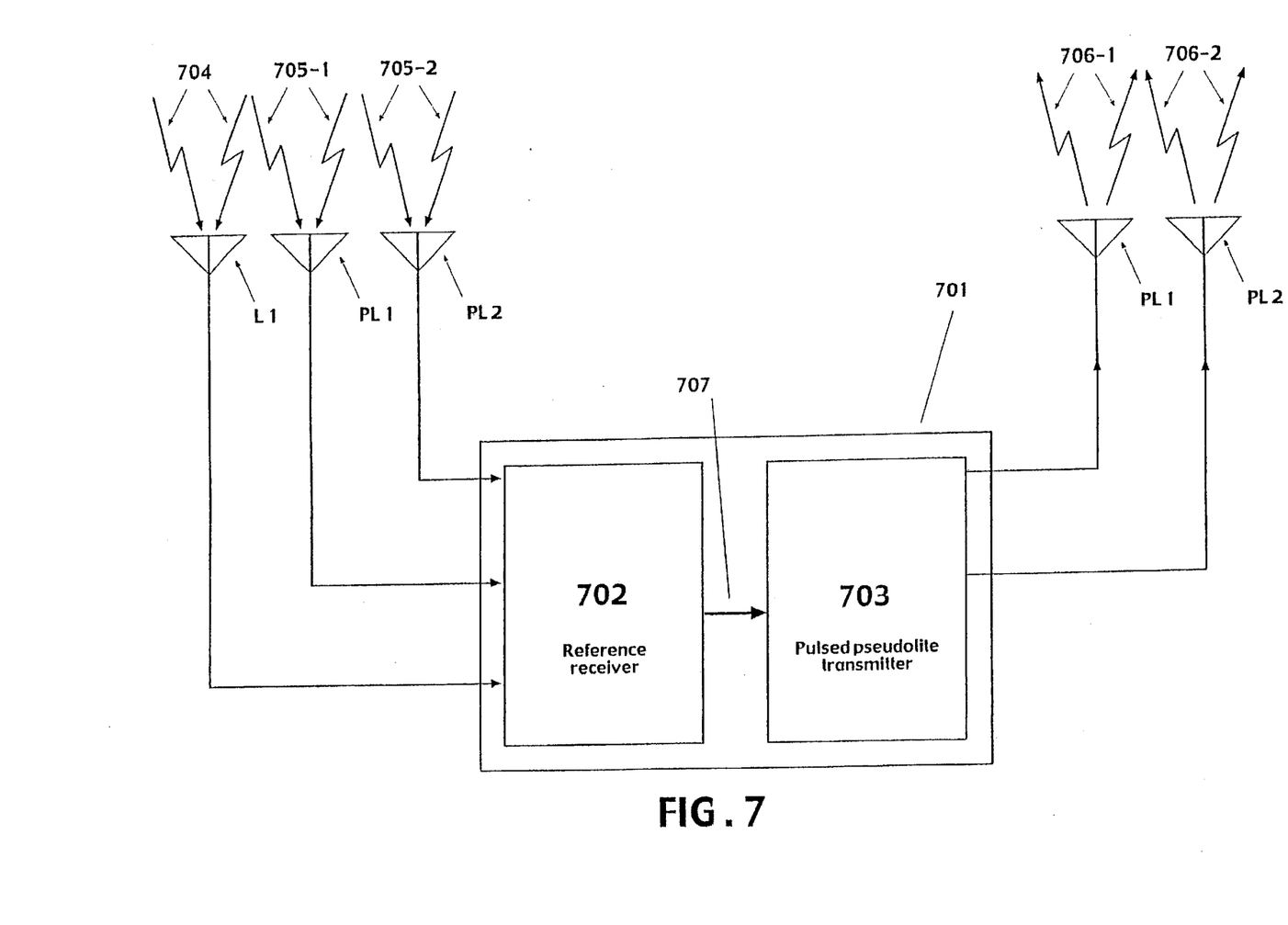
FIG. 7 is a block diagram showing the overall structure of one embodiment of a network positioning-unit device, according to the present invention.

Referring to FIG. 7, there is depicted a preferred hardware embodiment of the previously described positioning-unit device 701, comprising a triple frequency reference receiver 702, and a dual-frequency pulsed pseudolite transmitter 703. The triple frequency reference receiver 702 is capable of receiving Coarse/Acquisition (C/A) pseudorandom codes from all GPS satellites on L1 (1575.42 MHz) 704 and all positioning-unit device pulsed pseudolites on two predefined pseudolite frequencies 705, preferably but not limited to the Industrial, Scientific & Medical (ISM) band of 2.4 GHz. The triple frequency reference receiver 702 passes positioning data to the co-located pulsed pseudolite transmitter 703, via data link 707. The calculated position is also stored in non-volatile memory for future reference.

The positioning-unit device pulsed pseudolite transmitter 703 comprises a dual frequency bi-phase shift key (BPSK) transmitter capable of transmitting two discrete 1023 bit C/A codes chipped at a rate of 1.023 MHz, preferably in the 2.4 GHz ISM band. Each frequency 706 has a 1000 bps navigation message BPSK modulated upon each C/A code. As previously stated, the preferred embodiment of the NPS signal structure remains closely related to the GPS signal structure for optimum compatibility. Standard GPS navigation data is transmitted at a rate of 50 bps. To improve the communication bandwidth, the preferred NPS embodiment utilises a bandwidth of 1000 bps per carrier. This gives access to a 2000 bps data link per pseudolite. Moreover, quadurature phase shift keying (QPSK) or data compression techniques may be used in other embodiments to further extend the communication bandwidth.

The preferred embodiment positioning-unit device pseudolite transmits two frequencies for the utilisation of the wide-lane integer ambiguity resolution technique. These frequencies are transmitted within an ISM band which are offset from the GPS L1 frequency of 1575.42 MHz. This ensures the positioning-unit device transmissions do not interfere with standard GPS signals on L1. A further advantage of transmitting in an ISM band is that positioning-unit devices can be used without specific regulatory approval.

The preferred positioning-unit device is able to demodulate standard GPS 50 bits per second (bps) navigation messages from GPS satellites, 1000 bps navigation messages from the positioning-unit device pseudolites, and 250 bps navigation messages from the Wide Area Augmentation System (WAMS) satellites. This allows the positioning-unit devices to utilise data available from all sources, providing the most accurate and seamless integration possible.

Because the stationary positioning-unit device hardware is not limited to special placement needs, it would be possible to manufacture the positioning-unit device into an enclosure that plugs directly into a wall power socket, for example. Assuming there is already a limited network available, once plugged in, the positioning-unit devices would automatically integrate into the network.

Network Initialization

Referring again to FIG. 5, a first positioning-unit device 502-1, consisting of a reference receiver 503-1, and co-located positioning-unit device pulsed pseudolite 504-1, self-surveys against the GPS constellation 501 and determines an averaged position. Alternatively the positioning-unit device is placed at a precisely known location. Subsequently, the first positioning-unit device's reference receiver 503-1, determines LADGPS/CDGPS measurements for all GPS signals in view 506 and for its co-located pulsed pseudolite transmitter 504-1. The averaged position and LADGPS/CDGPS measurements are then transmitted in the navigation message from the co-located pulsed pseudolite transmitter 504-1.

A second positioning-unit device 502-2 is placed within range of the first positioning-unit device 502-1. The second positioning-unit device's reference receiver 503-2 receives GPS satellite signals 506 and signals from the first positioning-unit device pulsed pseudolite transmitter 504-1. The second positioning-unit device 502-2 uses the first positioning-unit device's 502-1 LADGPS/CDGPS measurements 507 and range signals to determine an accurate position. Subsequently, the second positioning-unit device 502-2 determines LADGPS/CDGPS measurements for all GPS satellites 501 and positioning-unit devices 502 in view. The position and LADGPS/CDGPS measurements are then transmitted in the navigation message from the co-located pulsed pseudolite transmitter 504-2.

A third positioning-unit device 502-3 is placed within range of the first positioning-unit device 502-1 and the second positioning-unit device 502-2 and determines position in the same manner as the first positioning-unit device 502-1 and the second positioning-unit device 502-2. This third positioning-unit device 502-3, now has two sets of LADGPS/CDGPS measurements to select from.

A fourth positioning-unit device 502-4 is placed within range of the first positioning-unit device 502-1, the second positioning-unit device 502-2 and the third positioning-unit device 502-3. The fourth positioning-unit device 502-4 now determines its position in the same manner as the previous three positioning-unit devices. This fourth positioning-unit device 502-4, now has three sets of LADGPS/CDGPS measurements to select from.

With at least four positioning-unit devices initialised, the network can begin extension and propagation without requiring a 'skyview'. From this time on, any positioning-unit device that is in range of any combination of four GPS satellites or positioning-unit devices, can determine its position and continue to propagate the NPS.

Figure 8:
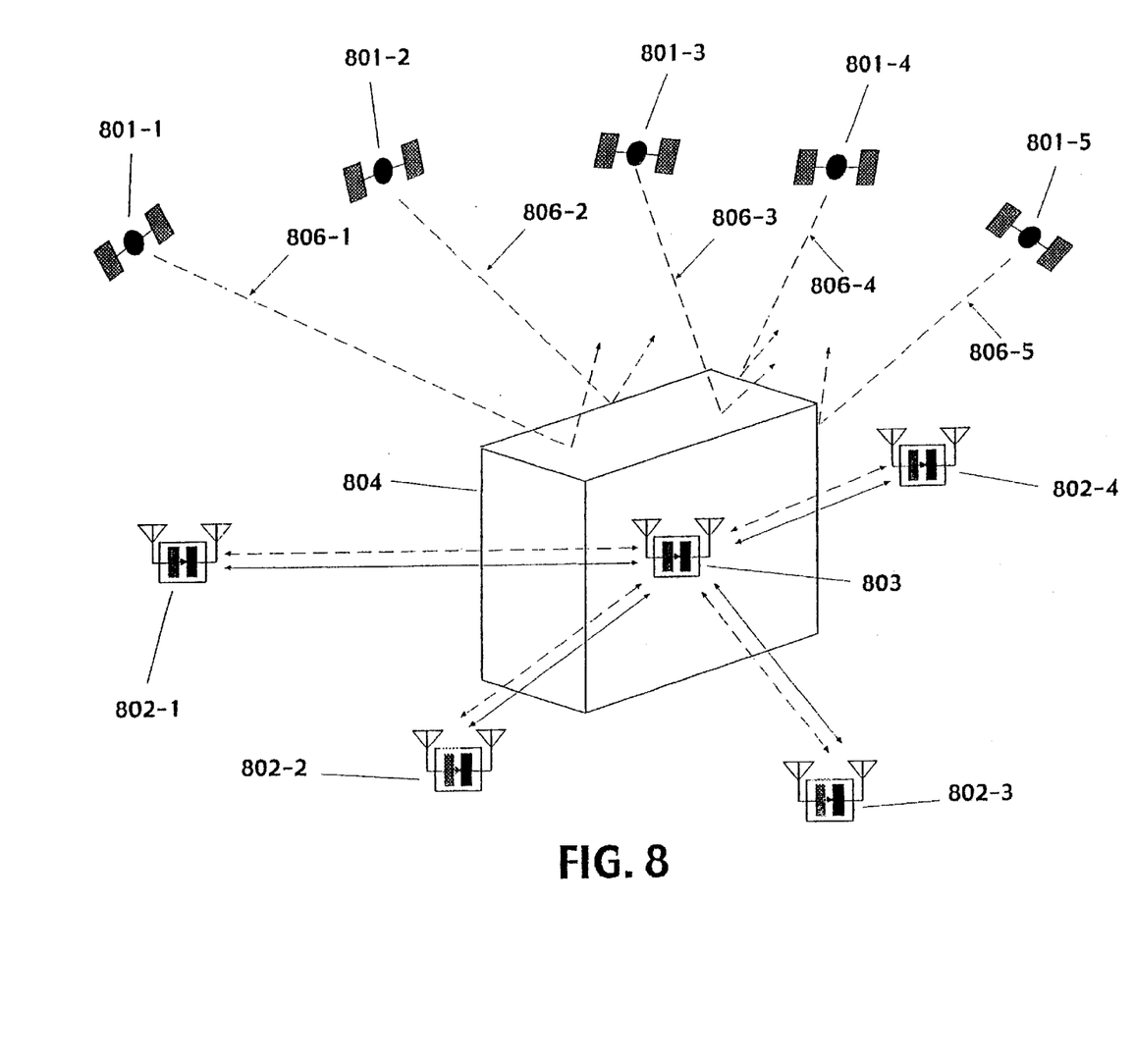
FIG. 8 is a graphical representation of the another embodiment of the Network Positioning System according to the present invention, in a satellite-obscured environment.

Referring now to FIG. 8. With four or more stationary positioning-unit devices 802-1, 802-2, 802-3, 802-4, judiciously placed and in operation, it is possible to receive ranging signals in satellite obscured environments, such as "urban canyons" and inside buildings 804. This allows a positioning-unit device 803 that is obscured from all GPS satellite signals 806, yet still in view of at least four positioning-unit devices 802-1, 802-2, 802-3, 802-4, the ability to determine its position. Positioning-unit device signal penetration may be limited inside buildings 804. However, once an indoor positioning-unit device 803 has a position solution, further positioning-unit devices are able to self-integrate and propagate from this device 803, extending the NPS deeper into the indoor environment. This allows the development of a "web-like" structure of positioning-unit devices. This web-like structure of the network ensures that the NPS acquires advantages such as good geometry, high signal strengths, more observables for ranging, instant ambiguity resolution, all of which lead to extremely high accuracy.

Good geometry is paramount to accurate determination of position, and the subsequent successful propagation of positioning-unit devices. Geometry is measured with a unitless term known as "Geometric Dilution of Precision" (GDOP). It is preferred that geometric propagation errors be tightly controlled by disallowing propagation of positioning-unit devices in high GDOP conditions. It is also preferred that a threshold be initiated so as not to use positioning-unit devices with excessive GDOP values.

Examples of Network Structures

The preferred embodiment of the NPS allows a single positioning-unit user device to determine its position in many different ways depending on the circumstances of the surrounding environment.

A positioning-unit user device can be used as an autonomous GPS receiver, capable of ranging from at least three GPS satellite signals. This will yield position accuracy of approximately 100 meters 2 dRMS.

A positioning-unit user device is capable of ranging from at least two GPS satellite signals, and also ranging from a WAAS differential correction satellite, yielding differential position accuracy of several meters.

A positioning-unit user device is capable of ranging from at least two GPS satellite signals, and also ranging from one other stationary positioning-unit device. The stationary positioning-unit device provides a further ranging source, and also provides LADGPS corrections for metre-level position accuracy. A single stationary positioning-unit device can also provide CDGPS corrections if the initial integer cycle ambiguity can be resolved. This may be achieved by conventional satellite or mobile positioning-unit device geometry change.

A positioning-unit user device is capable of ranging from a plurality of GPS satellite signals, and also ranging from a plurality of stationary positioning-unit devices, such as in urban canyons. This scenario provides ample ranging sources with good geometry. With access to five dual-frequency positioning-unit devices, single-epoch wide-lane carrier phase integer ambiguity resolution can be performed, thereby delivering centimeter accuracy.

A positioning-unit user device is capable of ranging solely from a plurality of stationary positioning-unit devices. This occurs in satellite occluded environments such as inside buildings. With access to five dual-frequency positioning-unit devices, single-epoch wide-lane carrier phase integer ambiguity resolution can be performed, thereby delivering centimeter accuracy.

Alternate Embodiments

Positioning-unit devices can include precision time standards, such as atomic clocks, to allow autonomous absolute positioning in this embodiment positioning-unit device clocks would need to be monitored and time-transfer techniques implemented to maintain network time integrity.

Positioning-unit devices can communicate on a pairs-wise basis, therefore allowing relative positioning to occur between devices. This relative positioning technique can be extended to a network of positioning-unit devices, allowing a web-like structure of relative positioning-unit devices to be created.

Mobile positioning-unit devices can be configured as receive-only devices. In this situation mobile positioning-unit devices require at least four other transmitting positioning-unit devices to be in view for 3-dimensional position determination.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. For location, a method of creating a collaborating network of positioning-unit devices, the network allowing distribution of a common coordinate frame, timebase and network data to all positioning-unit devices within the network, the method comprising the steps of:
   a) deploying one or more positioning-unit devices, each positioning-unit device comprising:
      i) means for receiving signals transmitted by Global Navigation Satellite System satellites and by positioning-unit devices;
      ii) means for interpreting said received signals and consequently generating a unique ranging signal; and
      iii) means for transmitting said unique ranging signal;
   b) interpreting said received signals by said each positioning-unit device to deduce:
      i) the position and time of said each positioning-unit device; and
      ii) network data;
   c) generating said unique ranging signal based on said interpreted signals incorporating
      i) said deduced position and time of said each positioning-unit device; and
      ii) said deduced network data;
      iv) transmitting said unique ranging signal
   such that positioning-unit devices deployed in Global Navigation Satellite System signal-occluded environments may be integrated into the network.

2. The method of claim 1, wherein said one or more positioning-unit devices further include means configured to synchronize to other positioning-unit devices via said unique ranging signal.

3. The method of claim 1, wherein said one or more positioning-unit devices further include means configured to synchronize to Global Navigation Satellite System signals.

4. The method of claim 1, wherein said one or more positioning-unit devices pulse the transmission of said unique ranging signal to allow a plurality of positioning-unit devices to share a common transmission frequency.

5. The method of claim 1, wherein said one or more positioning-unit devices further include means for receiving, demodulating and interpreting modulated signals, said modulated signals selected from the group consisting of Global Navigation Satellite System satellites and positioning-unit devices, to derive communication data for distribution throughout the network.

6. The method of claim 1, wherein said one or more positioning-unit devices further include means for receiving, demodulating and interpreting modulated signals, said modulated signals selected from the group consisting of Global Navigation Satellite System satellites and positioning-unit devices and other available differential correction services, to derive differential correction data for refining positioning information.

7. The method of claim 1, wherein said one or more positioning-unit devices further include multiple frequency transmission means for modulating said unique ranging signal, permitting use of wide-lane carrier phase integer cycle ambiguity resolution techniques.

8. The method of claim 1, wherein said one or more positioning-unit devices further include means for receiving and demodulating multiple frequency transmissions of said unique ranging signal, permitting wide-lane techniques for resolution of carrier phase integer cycle ambiguity.

9. For location, a method or creating and expanding a collaborating network of positioning-unit devices, the network allowing distribution of a common coordinate frame, timebase and network data to all positioning-tail devices within the network, the method comprising the steps of:
   a) create the network by the method comprising the steps of:
      i) deploying one or more positioning-unit devices, each positioning-unit device comprising:
         1) means for receiving signals transmitted by Global Navigation Satellite System satellites and by positioning-unit devices;
         2) means for interpreting said received signals and consequently generating a unique ranging signal; and
         3) means for transmitting said unique ranging signal;
      ii) interpreting said received signals by said each positioning-unit device to deduce:
         1) the position and time of said each positioning-unit device; and
         2) network data,
      iii) generating said unique ranging signal based on said interpreted signals incorporating:
         1) said deduced position and time of said each positioning-unit device; and
         2) said deduced network data;
      iv) transmitting said unique ranging signal;
   b) deploy an additional positioning-unit device that is required to integrate with and expand the network;
   c) receive and process at said additional positioning-unit device signals transmitted by Global Navigation Satellite System satellites and said unique ranging signals transmitted by said one or more positioning-unit devices to determine a relationship between said additional positioning-unit device and the network;
   d) generate an additional unique ranging signal at said additional positioning-unit device based upon said determined relationship; and, e) transmit said additional unique ranging signal from said additional positioning-unit device such that the deployment of additional positioning-unit devices will expand the common coordinate frame, timebase and network data of the network over a substantially unlimited geographical area.

10. The method of claim 9, wherein said one or more positioning-unit devices further include means configured to synchronize to other positioning-unit devices via said unique ranging signal.

11. The method of claim 9, wherein said one or more positioning-unit devices further include means configured to synchronize to Global Navigation Satellite System signals.

12. The method of claim 9, wherein said one or more positioning-unit devices pulse the transmission of said unique ranging signal to allow a plurality of positioning-unit devices to share a common transmission frequency.

13. The method of claim 9, wherein said one or more positioning-unit devices further include means for receiving, demodulating and interpreting modulated signals, said modulated signals selected from the group consisting of Global Navigation Satellite System satellites and positioning-unit devices, to derive communications data for distribution throughout the network.

14. The method of claim 9, wherein said one or more positioning-unit devices further include means for receiving demodulating and interpreting modulated signals, said modulated signals selected from the group consisting of Global Navigation Satellite System satellites and positioning-unit devices and other available differential correction services, to derive differential correction data fur refining positioning information.

15. The method of claim 9, wherein said one or more positioning-unit devices further include multiple frequency transmission means for modulating said unique ranging signal, permitting use of wide-lane carrier phase integer cycle ambiguity resolution techniques.

16. The method of claim 9, wherein said one or more positioning-unit devices further include means for receiving and demodulating multiple frequency transmissions of said unique ranging signal, permitting wide-lane techniques for resolution of carrier phase integer cycle ambiguity.

17. For location, a positioning-unit device for creating and consequently expanding a collaborating network of positioning-unit devices, the device comprising:
    a) means for receiving signals transmitted by Global Navigation Satellite System satellites and by positioning-unit devices;
    b) means for interpreting said received signals to deduce the position and time of said positioning-unit device, and deduce network data;
    c) means for interpreting said deduced position, time and network data and consequently generating a unique ranging signal; and
    d) means for transmitting said unique ranging signal
    such that a common coordinate frame, timebase and network data is distributed throughout the network.

18. The positioning-unit device of claim 17, further incorporating means configured to synchronize to other positioning-unit devices via said unique ranging signal.

19. The positioning-unit device of claim 17, further incorporating means configured to synchronize to Global Navigation Satellite System signals.

20. The positioning-unit device of claim 17, further incorporating means to pulse the transmission of said unique ranging signal, to allow a plurality of positioning-unit devices to share a common transmission frequency.

21. The positioning-unit device of claim 17, further incorporating means for receiving, demodulating and interpreting modulated signals, said modulated signals selected from the group consisting of Global Navigation Satellite System satellites and positioning-unit devices, to derive communications data for distribution throughout the network.

22. The positioning-unit device of claim 17, further incorporating means for receiving, demodulating and interpreting modulated signals, said modulated signals selected from the group consisting of Global Navigation Satellite System satellites and positioning-unit devices and other available differential correction services, to derive differential correction data for refining positioning information.

23. The positioning-unit device of claim 17, further incorporating multiple frequency transmission means for modulating said unique ranging signal, permitting use of wide-lane carrier phase integer cycle ambiguity resolution techniques.

24. The positioning-unit device of claim 17, further incorporating means for receiving and demodulating multiple frequency transmissions of said unique ranging signal, permitting wide-lane techniques for resolution of carrier phase integer cycle ambiguity.

25. A device for interpreting the position, time and network data information contained in signals that are generated and transmitted by positioning-unit devices within a collaborating network of positioning-unit devices, the device comprising:
    a) means for receiving a unique ranging signal, said unique ranging signal being created by the method comprising the following steps:
        i) deploying one or more positioning-unit devices, each positioning-unit device comprising:
            1) means for receiving signals transmitted by Global Navigation Satellite System satellites and by positioning-unit devices;
            2) means for interpreting said received signals and consequently generating said unique ranging signal; and
            3) means for transmitting said unique ranging signal;
        ii) interpreting said received signals by said each positioning-unit device to deduce:
            1) the position and time of said each positioning-unit device; and
            2) network data;
        iii) generating said unique ranging signal based on said interpreted signals incorporating:
            1) said deduced position and time of said each positioning-unit device; and
            2) said deduced network data;
        iv) transmitting said unique ranging signal;
    b) means for processing said unique ranging signal to determine position, time and network data for the device; and
    d) means for outputting said determined position, time and network data for further processing.

26. The device of claim 25, wherein said one or more positioning-unit devices further include means configured to synchronize to other positioning-unit devices via said unique ranging signal.

27. The device of claim 25, wherein said one or more positioning-unit devices further include means configured to synchronize to Global Navigation Satellite System signals.

28. The device of claim 25, wherein said one or more positioning-unit devices pulse the transmission of said unique ranging signal, to allow a plurality of positioning-unit devices to share a common transmission frequency.

29. The device of claim 25, wherein said one or more positioning-unit devices further include means for receiving, demodulating and interpreting modulated signals, said modulated signals selected from the group consisting of Global Navigation Satellite System satellites and positioning-unit devices, to derive communications data for distribution throughout the network.

30. The device of claim 25, wherein said one or more positioning-unit devices further include means for receiving, demodulating and interpreting modulated signals, said modulated signals selected from the group consisting of Global Navigation Satellite System satellites and positioning-unit devices and other available differential correction services, to derive differential correction data for refining positioning information.

31. The device of claim 25, wherein said one or more positioning-unit devices further include multiple frequency transmission means for modulating said unique ranging signal, permitting use of wide-lane carrier phase integer cycle ambiguity resolution techniques.

32. The device of claim 25, wherein said one or more positioning-unit devices further include means for receiving and demodulating multiple frequency transmissions of said unique ranging signal, permitting wide-lane techniques for resolution of carrier phase integer cycle ambiguity.

\* \* \* \* \*